United States Patent Office 3,845,113
Patented Oct. 29, 1974

3,845,113
SULPHONIC ACID GROUP-CONTAINING
COMPOUNDS
Klaus Walz, Leverkusen, Walter Hees, Cologne-Hoehenberg, and Mathieu Quaedvlieg, Opladen, Germany, assignors to Bayer Aktiengesellschaft, Leverkusen, Germany
No Drawing. Filed Aug. 19, 1969, Ser. No. 851,484
Claims priority, application Germany, Aug. 28, 1968,
P 17 93 299.9
Int. Cl. C07c *143/42, 143/52*
U.S. Cl. 260—507                    8 Claims

ABSTRACT OF THE DISCLOSURE

Sulphonic acid group containing compounds which contain 2–10 recurrent structural units of the formula

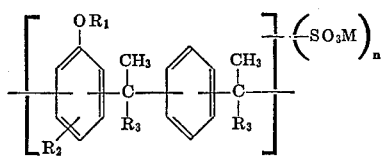

in which $R_1$ represents hydrogen, an alkyl radical which contains 1 to 4 carbon atoms and may be substituted, or an aralkyl radical, $R_2$ represents hydrogen, an alkyl, cycloalkyl, aralkyl or aryl group, or a halogen atom, $R_3$ represents hydrogen or a methyl group, $n$ is a number between 0.7 and 2, and M represents hydrogen, an alkali metal or alkaline earth metal atom, or an ammonium group, a process for their production and their use as dyeing auxiliaries for the dyeing of natural and synthetic polyamides with 1:2 metal complex dyestuffs.

---

The present invention relates to sulphonic acid group-containing compounds, to a process for their production and their use as dyeing auxiliaries. More particularly it concerns sulphonic acid group-containing compounds which contain 2 to 10, preferably 2 to 4, recurrent structural units of the formula

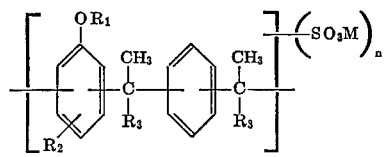

in which $R_1$ represents hydrogen, an alkyl radical which contains 1 to 4 carbon atoms and may be substituted, or an aralkyl radical.

$R_2$ represents hydrogen, an alkyl, cycloalkyl, aralkyl or aryl group, or a halogen atom, $R_3$ represents hydrogen or a methyl group, $n$ is a number between 0.7 and 2, and M represents hydrogen, an alkali metal or alkaline earth metal atom, or an ammonium group, a process for their production and their use as dyeing auxiliaries for the dyeing of natural and synthetic polyamides with 1:2 metal complex dyestuffs.

For $R_1$ there may be mentioned as optionally substituted alkyl radicals containing 1 to 4 carbon atoms the following, for example, the methyl, ethyl, isopropyl radical and the $n$ or secondary butyl radical, furthermore the carboxymethyl or carbamidomethyl, the 2-chloroethyl or 2-hydroxyethyl radical, also the ω-sulphonylpropyl or the ω-sulphonylbutyl radical. The benzyl radical is particularly suitable as aralkyl radical.

Alkyl groups particularly suitable for $R_2$ are $C_1$ to $C_{16}$ alkyl groups, e.g. the methyl, ethyl, iso-propyl, $n$- and iso-octyl, $n$- and iso-nonyl, iso-dodecyl and hexadecyl group; cycloalkyl groups are especially the cyclohexyl group; the aralkyl groups is especially the benzyl- and the phenyl-ethyl group; the phenyl group is especially suitable as aryl group. As halogen atoms for $R_2$ there may be especially mentioned chlorine and bromine atoms.

Alkali metal atoms for M are particularly sodium and potassium atoms; alkaline earth metal atoms are especially magnesium and calcium atoms. Besides the ammonium group itself, those ammonium groups are mainly suitable which are derived from aliphatic amines, such as di- and triethylamine, or mono-, di- and triethanolamine, cycloaliphatic amines, such as cyclohexylamines, and cyclic amines, such as piperadine, morpholine or pyridine.

The sulphonic acid group-containing compounds according to the invention are obtained by sulphonating condensation products which contain 2 to 10, preferably 2 to 4, recurrent structural units of the formula

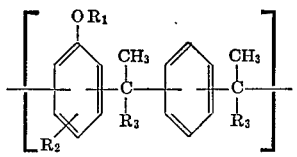
(II)

in which $R_1$, $R_2$ and $R_3$ have the meaning given for formula (I), with the customary sulphonating agents, e.g. sulphuric acid, sulphur trioxide or its addition compounds, such as oleum or chlorosulphonic acid, optionally followed by neutralising the free sulphnic acids with alkali metal or alkailne earth metal oxides, hydroxides or carbonates, ammonia or amines.

The sulphonation can advantageously be carried out in organic solvents which are inert towards sulphonating agents, e.g. in hydrocarbon chlorides, such as chloroform, carbon tetrachloride, trichloro-ethylene or trichloro-ethylene or trichloro-ethane, or in ethers, such as diethyl ether and dioxan, at temperatures between 0° and 80° C. The sulphonating agents are used in such amounts that 0.7 to 2 sulphonic acid groups are apportioned to each basic unit of the condensation product consisting of 1 molecule phenol and 1 molecule divinyl-benzene or diisopropenyl-benzene.

The condensation products on which the sulphonic acid group-containing compounds according to the invention are based can be prepared in known manner. They can be produced, for example, by reacting phenols with divinyl-benzene which may also be present in the form of its technical mixtures with ethylvinyl-benzene, or with diisopropenyl-benzene in the presence of acidic catalysts, such as $H_2SO_4$, $AlCl_3$, $BF_3$ and their addition products, $ZnCl_2$ or $SnCl_4$, at temperatures between 20° and 120° C.; phenols and divinyl-benzene or diisopropenyl-benzene are expediently employed in a molecular ratio 1:0.5–1.5. Inert solvents, such as hydrocarbons, e.g. hexane, octane, cyclohexane, benzene, toluene, xylene, or chlorinated hydrocarbons, e.g. carbon tetrachloride, may be added, if desired.

Phenols suitable for the production of the condensation products are those aromatic hydroxyl compounds which contain in the nucleus at least two reactive hydrogen atoms, e.g. phenol, cresols, isopropylphenols, octylphenol, nonylphenol, iso-nonyphenol, iso-dodecylphenol, hexadecylphenol, cyclohexylphenols, hydroxydiphenylmethane, hydroxydiphenyl as well as chloro- and bromo-phenols.

The condensation products may be etherified, e.g. by the reaction with alkyl halides, such as methyl iodide, ethyl bromide, ethylene chloride, ethylene chlorohydrin, chloroacetic acid, chloroacetamide or benzyl chloride; or with dialkyl sulphates, such as dimethyl- and diethyl sulphate; or with sultones, such as propane- and butane-sultone.

The dyeing of the polyamide materials with 1:2 metal complex dyestuffs in the presence of the sulphonic acid group-containing compounds of the formula (I) according to the invention can be carried out in such a manner that the goods to be dyed are introduced into an aqueous bath heated to 40° to 50° C. and containing the 1:2 metal complex dyestuffs, the sulphonation products to be used according to the invention, and acids, e.g. acetic acid, the temperature of the dyebath is then slowly raised to 100° to 130° C. and the temperature maintained until the bath is exhausted. It has proved to be particularly advantageous to pre-treat the dyeing material for a short time at 40° to 50° C. with an aqueous liquor which only contains the sulphonic acid group-containing compounds of the formula (I) and acids, and only then to add the dyestuffs to the bath at temperatures between 40° and 98° C., followed by slowly increasing the temperature of the dyebath to 100° to 130° C. maintaining this temperature until the bath is exhausted.

The amounts in which the sulphonic acid group-containing compounds of the formula (I) are added to the dyebaths may vary within wide limits; they can readily be determined by preliminary experiments. Dependent upon the desired depth of colour, amounts of 0.5 to 3 percent by weight, referred to the weight of the dyeing goods, have generally proved to be satisfactory.

The dyeing process is suitable for natural polyamides, such as wool and silk, but particularly for all synthetic polyamides, such as polycaprolactam, polyhexamethylenediamine adipate or poly-ω-amino-undecanic acid.

With the aid of the process according to the invention it is possible to dye with 1:2 metal complex dyestuffs outstandingly evenly polyamide fibre materials in processed forms of the greatest variety, for example, in the form of flocks, combed material, textured filaments, spun cable sheathing, yarn, woven and knitted fabrics or fleeces; in particular, the streakiness frequently occurring when dyeing woven or knitted fabrics of synthetic polyamides is obviated.

The parts given in the following examples are parts by weight.

EXAMPLE 1

The solution of 350 parts of the condensation product described below in 300 parts ethylene chloride is slowly mixed at 20° C. with 127 parts chlorosulphonic acid. When the addition is completed the mixture is further stirred at 30 to 40° C. for 5 hours and subsequently neutralised with a dilute sodium hydroxide solution. After distilling off the solvent and water in a vacuum, there remain 460 parts of a solid water-soluble resin.

The condensation product used was obtained in the following manner: 220 parts iso-nonylphenol were dissolved in 200 parts toluene and 5 parts boron fluoride etherate added. 130 parts technical divinyl benzene (60%) were subsequently added dropwise at 50° to 60° C. and the mixture was stirred for 3 hours at the same temperature. The catalyst was precipitated by passing in ammonia. After filtering off the precipitate, the toluene was distilled off from the filtrate in a vacuum.

EXAMPLE 2

25.6 parts chlorosulphonic acid are slowly added dropwise at 20° to 30° C. to a solution of 78 parts of the condensation product described below in 100 parts carbon tetrachloride. After further stirring at 40° C. for 5 hours, the reaction mixture is neutralised with triethanolamine. After distilling off the water and the carbon tetrachloride, there remain 128 parts of a water-soluble resin.

The condensation product used was obtained in the following manner: 52 parts iso-dodecylphenol were dissolved in 50 parts toluene; the solution was mixed with 0.8 parts boron fluoride diacetic acid followed by the dropwise addition at 40° to 50° C. of 26 parts technical divinyl benzene (60%). After further stirring for 6 hours at 40° to 50° C., the catalyst was precipitated with ammonia. After filtering off the precipitate, the toluene was distilled off in a vacuum.

EXAMPLE 3

The solution of 72 parts of the condensation product described below in 50 parts carbon tetrachloride is mixed dropwise at 20° C. with 25.6 parts chlorosulphonic acid. The reaction mixture is subsequently stirred at 40° to 50° C. for 5 hours. It is neutralised by adding 29 parts of a 45% sodium hydroxide solution, the water as well as the carbon tetrachloride are distilled off in a vacuum. There remain 97 parts of a water-soluble resin.

The condensation product used was obtained in the following manner: 140 parts of the condensation product described in Example 1 were dissolved in 100 parts ethanol, the solution was mixed first with 88 parts of a 10% sodium hydroxide solution followed by slowly adding at 30° to 40° C. 24.4 parts sodium chloroacetate. The solution was heated under reflux for 2 hours, cooled and acidified with 17 parts concentrated hydrochloric acid. The organic phase was separated and liberated from the solvent in a vacuum.

EXAMPLE 4

256 parts chlorosulphonic acid are added dropwise at 20° C. to the solution of 476 parts of the condensation product described below in 300 parts carbon tetrachloride. After further stirring at 40° C. for 5 hours, the reaction solution is neutralised with a sodium hydroxide solution and liberated from water and solvent in a vacuum. There are obtained 700 parts of a water-soluble powder.

The condensation product used was obtained in the following manner: 216 parts p-cresol were mixed with 10.8 parts boron fluoride etherate, followed by slowly adding at 50° C. 260 parts technical divinyl benzene (60%). After the addition of about 170 parts divinyl benzene, the reaction mixture was diluted with 300 parts carbon tetrachloride. When the addition of divinyl benzene was completed, the reaction mixture was further stirred at 50° C. for 3 hours and subsequently liberated from the solvent.

EXAMPLE 5

The solution of 350 parts of the condensation product described below in 300 parts carbon tetrachloride is slowly mixed at 20° C. with 256 parts chlorosulphonic acid, followed by stirring at 40° to 50° C. for 5 hours. The reaction mixture is neutralised with a cold dilute sodium hydroxide solution and liberated from water and carbon tetrachloride in a vacuum. There obtained 576 parts of a water-soluble powder.

The condensation product used was obtained in the following manner: 220 parts nonylphenol and 3.0 parts boron fluoride-diacetic acid were dissolved in 300 parts carbon tetrachloride, and 130 parts technical divinyl-benzene (60%) slowly added at 40° C. After completion of the addition, the mixture was stirred for 8 hours at 40° to 50° C. and for 12 hours at room temperature; the solvent was subsequently removed in a vacuum.

EXAMPLE 6

The solution of 189 parts of the condensation product described below in 150 parts carbon tetrachloride is slowly mixed at 20° C. with 66.5 parts chlorosulphonic acid. After stirring at 40° to 50° C. for 5 hours, the reaction mixture is neutralised with a sodium hydroxide solution and the water and the solvent are distilled off in a vacuum. There remain 245 parts of a water-soluble resin.

The condensation product used was obtained in the following manner: 110 parts nonylphenol and 1.5 parts boron fluoride-diacetic acid were slowly mixed at 40° C. with a solution of 79 parts diisopropenyl-benzene in 150 parts carbon tetrachloride. When the addition was completed, a further 100 parts carbon tetrachloride were added. After further stirring at 40° C. for 5 hours and separation of the catalyst, the solvent was distilled off in a vacuum.

EXAMPLE 7

The solution of 306 parts of the condensation product described below in 200 parts carbon tetrachloride is slowly mixed at 20° C. with 116 parts chlorosulphonic acid, followed by further stirring at 50° C. for 5 hours. After neutralising with a sodium hydroxide solution and distilling off water and carbon tetrachloride in a vacuum, 410 parts of a water-soluble, solid resin are obtained.

The condensation product used was obtained in the following manner: 176 parts p-cyclohexylphenol and 3 parts boron fluoride-diacetic acid were dissolved at 70° to 80° C. in 430 parts toluene and slowly mixed at this temperature with 130 parts technical divinyl benzene (60%). After completion of the addition, the mixture was further stirred at 60° C. for 3 hours. After precipitating the catalyst with ammonia and separating the precipitate, the solution was liberated from toluene in a vacuum.

EXAMPLE 8

A knitted fabric of polycaprolactam filaments is introduced into a bath, at a goods-to-liquor ratio 1:40, heated to 40° C., adjusted to a pH value of 6 with acetic acid and containing, per litre, 0.5 g. of the compound obtained according to Example 1. The material is treated in the bath, while heating it up to 80° C., and per litre, 0.25 g. of the chromium (1:2) complex of the formula

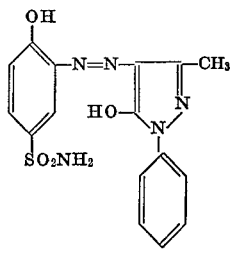

are then added. The dyebath is then slowly heated to 98° C., and kept at this temperature for about 60 minutes. There results a bright orange dyeing of absolute levelness.

The same good result was achieved if the levelling agent used was replaced with the compounds produced according to the Examples 3, 5 and 7.

EXAMPLE 9

A knitted material of polyhexamethylene-diamine adipate filaments is introduced, at a goods-to-liquor ratio 1:30, into a bath heated to 40° C., adjusted to pH value 6.5 with acetic acid and containing, per litre, 0.75 g. of the compound obtained according to Example 1. The material is initially pre-treated in this bath while slowly heating it to 85° C. 0.33 g. of the chromium (1:2) complex of the formula

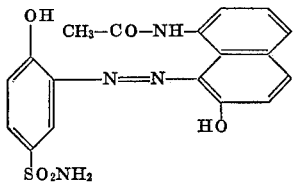

are then added and the dyebath is slowly further heated to 98° C. After a dyeing time of about 90 minutes, the bath is exhausted. An outstanding level grey dyeing is obtained.

The same good result was achieved if the levelling agent used was replaced with the compound produced according to Example 2.

EXAMPLE 10

A thermofixed fabric of polycaprolactam filaments is introduced, at a goods-to-liquor ratio 1:20, into a bath heated to 40° C., adjusted to the pH value of 5.5 and containing, per litre, 0.8 g. of the compound obtained according to Example 1 and 1 g. of the chromium-(1:2)-complex of the formula

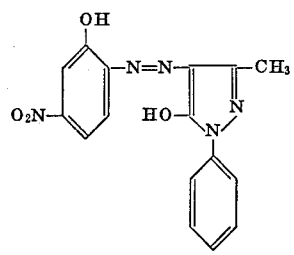

The dyebath is slowly heated to 120° C. and kept at this temperature for about 45 minutes. A complete drawing capacity of the dyestuff can be achieved by a further addition of acetic acid. A full red dyeing of outstanding levelness is obtained.

EXAMPLE 11

A knitted fabric of polycaprolactam filaments is introduced, at a goods-to-liquor ratio 1:20, into a bath heated to 50° C., adjusted to a pH of 5 with acetic acid and containing, per litre, 0.6 g. of the compound obtained according to Example 1. The material is treated in the bath, while heating it up to 98° C., and 1.7 g. of the chromium-(1:2)-complex of the formula

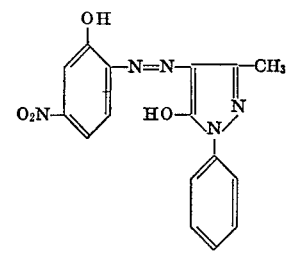

are then added per litre and 0.5 g. of the chromium-(1:2)-complex of the formula

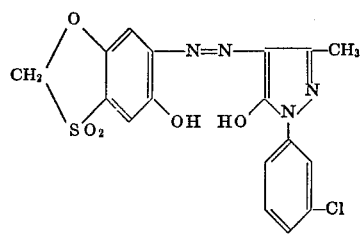

After a dyeing time of 120 minutes the liquor is practically exhausted. An outstandingly level, deep Bordeaux-coloured dyeing is obtained.

What is claimed is:

1. Sulphonic acid group-containing compounds which contain 2 to 10 recurrent structural units of the formula

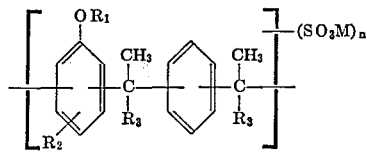

in which
- $R_1$ is hydrogen, benzyl, an unsubstituted alkyl of 1-4 carbon atoms, or an alkyl of 1 to 4 carbon atoms substituted by carboxy, carbamido, chloro, hydroxy, or sulphonyl;
- $R_2$ is hydrogen, an alkyl of 1-16 carbon atoms, cyclohexyl, benzyl, phenylethyl, phenyl, chloro, or bromo;
- $R_3$ is hydrogen or methyl;
- $n$ is a number between 0.7 and 2; and
- M is hydrogen, an alkali metal or alkaline earth metal or ammonium.

2. Sulphonic acid group-containing compounds according to Claim 1 wherein $R_1$ is hydrogen.

3. Sulphonic acid group-containing compounds of Claim 1 wherein $R_2$ is an alkyl of 6-16 carbon atoms.

4. Process for the production of sulphonic acid group-containing compounds which contain 2 to 10 recurrent structural units of the formula

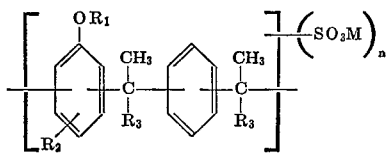

in which
- $R_1$ represent hydrogen, benzyl, an unsubstituted alkyl of 1-4 carbon atoms, or an alkyl of 1 to 4 carbon atoms substituted by carboxy, carbamido, chloro, hydroxy, or sulphonyl;
- $R_2$ is hydrogen, an alkyl of 1-16 carbon atoms, cyclohexyl, benzyl, phenylethyl, phenyl, chloro, or bromo;
- $R_3$ represents hydrogen or a methyl group;
- $n$ is a number between 0.7 and 2, and
- M represents hydrogen, an alkali metal or alkaline earth metal atom, or an ammonium group, which comprises treating condensation products which contain 2 to 10 recurrent structural units of the formula

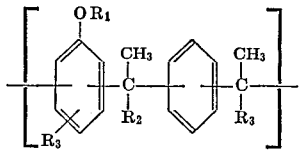

in which $R_1$, $R_2$ and $R_3$ have the same meaning as given above, dissolved in an inert organic solvent with a sulphonating agent.

5. Process according to Claim 4, wherein $R_1$ is hydrogen.

6. Process according to Claim 4 wherein $R_2$ is an alkyl of 6-16 carbon atoms.

7. Compounds of Claim 7 wherein $R_1$ is hydrogen, benzyl, an unsubstituted alkyl of 1-4 carbon atoms, carboxymethyl, carbamidomethyl, 2-chloroethyl, 2-hydroxyethyl, omega sulfonylpropyl, or omega sulfonylbutyl.

8. Process of Claim 4 wherein $R_1$ is hydrogen, benzyl, an unsubstituted alkyl of 1-4 carbon atoms, carboxymethyl, carbamidomethyl, 2-chloroethyl, 2-hydroxyethyl, omega sulfonylpropyl, or omega sulfonylbutyl.

References Cited
UNITED STATES PATENTS 2,953,597    9/1960    Gedeon et al. _____ 260—512

FOREIGN PATENTS 103,353    12/1965    Denmark _____ 260—512

DANIEL D. HORWITZ, Primary Examiner

U.S. Cl. X.R.

8—54, 55; 260—512